Dec. 26, 1933.  R. R. SEARLES ET AL  1,941,366

BEARING

Filed Aug. 26, 1931

Raymond R. Searles  INVENTORS
John W. Smith
BY
Mitchell & Bechert
ATTORNEYS

Patented Dec. 26, 1933

1,941,366

UNITED STATES PATENT OFFICE 1,941,366

BEARING

Raymond R. Searles and John W. Smith, New Britain, Conn., assignors to The Fafnir Bearing Company, New Britain, Conn., a corporation of Connecticut Application August 26, 1931. Serial No. 559,366

2 Claims. (Cl. 308—189)

This invention relates to an anti-friction bearing and consists in a novel and useful construction of certain parts thereof, the object being to produce a bearing that may be quickly and economically made and assembled.

One preferred form of our invention is shown in the accompanying drawing, in which—

Figure 1:
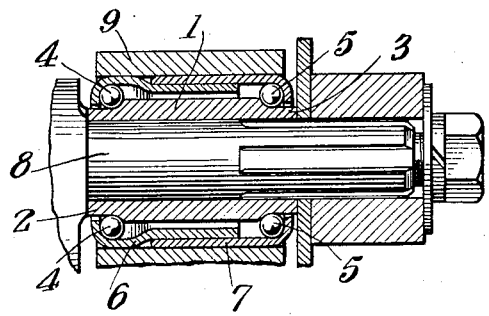
Fig. 1 is a sectional view partly in elevation of our new bearing assembled as in use.
Figure 2:
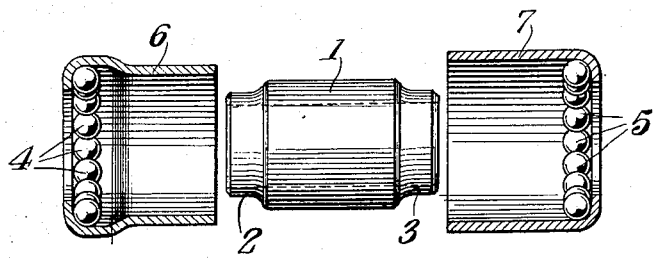
Fig. 2 is a side elevation also partly in section of the several parts of the bearing disassembled.

The bearing proper comprises an external and an internal part separated by two spaced rows of anti-friction devices which permit said parts to rotate relatively to each other with a minimum of friction. For convenience we will term the external part the external ring, and the internal part the internal ring. The internal ring comprises a relatively long sleeve-like body 1, the ends of which are drawn or turned down to form raceways 2—3 for two rows of anti-friction devices, for example, balls 4—5, respectively. Each of these raceways provides a thrust shoulder for the adjacent series of balls. The external ring comprises two interfitting parts 6—7, both of which are preferably so shaped that when assembled they provide ball tracks or races and thrust shoulders complementary to the thrust shoulders of the races on the ends of the inner ring. The two rows of balls may each comprise a full complement of balls, as shown, without the usual cages or retainers or, if desired, each series may comprise a limited number of balls held in proper assembled and spaced relation by any of the well known retainers or spacers common in this art and too well known to require illustration. When the balls and the inner and outer rings have been assembled as shown in Fig. 1, the two telescopic sleeve parts may be spot-welded at the overlap or they may be otherwise rigidly connected. These parts may also be so closely fitted that they will be held friction-tight in their proper adjusted position.

In Fig. 1 of the drawing we have shown the bearing assembled in operative position between two parts 8—9 which are designed to rotate relatively to each other. The inner bearing ring 1 has a passage of appropriate size to fit snugly on the part 8 while the part 9 may have a passage of suitable size to snugly receive the outer bearing ring. The overlap of the telescopic parts 6—7 gives a wide range of adjustment to meet different conditions. By drawing down the telescopic part of the sleeve 6 so that it will slide into the sleeve 7 and leaving the outer end of the sleeve 6 of the same external diameter as the external diameter of the sleeve 7, both sleeves 6 and 7 may fit friction-tight in the part 9, which latter may function to hold, or aid in holding, the sleeves 6 and 7 in the proper adjusted position as to overall length. Since this construction permits of a wide range of longitudinal adjustment, it is apparent that the invention is of particular value in long anti-friction bearings, that is to say, in bearings wherein the two rows or series of balls are widely separated. Since the parts 6 and 7 are telescopic, the raceways at the outer ends thereof are always positively held in perfect alinement in all positions of longitudinal adjustment of said parts.

The construction permits of the use of a comparatively thin gauge of metal in forming the sleeves 6—7 without sacrifice of strength, since the two thicknesses of metal at the intermediate portion of the ring reinforce said intermediate portion thereof, the corrugations which form the races at the ends of the outer ring reinforcing those portions thereof.

What we claim is:

1. In a device of the character indicated, a pair of sleeves having raceways thereon, said raceways being of substantially the same diameter, one of said sleeves being of substantially uniform diameter while the other of said sleeves is of reduced diameter to telescopically interfit with said uniform diameter, a bearing ring having raceways complementary to said first mentioned raceways, and anti-friction bearing members interposed between said complementary raceways, the outside diameter of said sleeves being the same except at their interfitting portions.

2. In a device of the character indicated, an inner ring having spaced apart bearing raceways, anti-friction bearing members on said raceways, a sleeve of substantially uniform thickness throughout and of uniform outside diameter throughout and having a raceway to engage the anti-friction bearing members on one of said inner ring raceways, a second sleeve of substantially uniform thickness throughout and having a part of the same outside diameter as the uniform diameter of said other sleeve and having a part of a diameter to telescopically interfit with said first mentioned sleeve, said second mentioned sleeve having a raceway to engage the anti-friction bearing members on the other of said inner ring raceways.

RAYMOND R. SEARLES.
JOHN W. SMITH.